(12) United States Patent
Kudo et al.

(10) Patent No.: US 10,126,522 B2
(45) Date of Patent: Nov. 13, 2018

(54) LENS DRIVE DEVICE, CAMERA MODULE, AND MOBILE TERMINAL WITH CAMERA

(71) Applicants: Shota Kudo, Tokyo (JP); Ichiro Hayashi, Tokyo (JP); Tomoyuki Murakami, Tokyo (JP)

(72) Inventors: Shota Kudo, Tokyo (JP); Ichiro Hayashi, Tokyo (JP); Tomoyuki Murakami, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 18 days.

(21) Appl. No.: 15/310,939

(22) PCT Filed: Apr. 24, 2015

(86) PCT No.: PCT/JP2015/002230
§ 371 (c)(1),
(2) Date: Nov. 14, 2016

(87) PCT Pub. No.: WO2015/174028
PCT Pub. Date: Nov. 19, 2015

(65) Prior Publication Data
US 2017/0082829 A1    Mar. 23, 2017

(30) Foreign Application Priority Data

May 14, 2014  (JP) .................................. 2014-100730
Aug. 18, 2014 (JP) .................................. 2014-165994

(51) Int. Cl.
G02B 27/64    (2006.01)
G02B 7/08     (2006.01)
(Continued)

(52) U.S. Cl.
CPC ................. *G02B 7/08* (2013.01); *G02B 7/04* (2013.01); *G02B 27/646* (2013.01); *G03B 5/00* (2013.01); *H04N 5/225* (2013.01)

(58) Field of Classification Search
None
See application file for complete search history.

(56) References Cited

U.S. PATENT DOCUMENTS

2008/0247063 A1    10/2008  Otsuki et al.
2013/0050828 A1     2/2013  Sato et al.
(Continued)

FOREIGN PATENT DOCUMENTS

CN    101158742 A    4/2008
CN    102955324 A    3/2013
(Continued)

OTHER PUBLICATIONS

International Search Report from International Application No. PCT/JP2015/002230 dated Jul. 14, 2015.
(Continued)

*Primary Examiner* — Derek S Chapel
(74) *Attorney, Agent, or Firm* — Brundidge & Stanger, P.C.

(57) ABSTRACT

A lens drive device is provided with: an AF drive unit that has an AF coil unit disposed around a lens unit and an AF magnet unit disposed separately in the radial direction with respect to the AF coil unit and automatically carries out focusing; and an OIS drive unit that has an OIS magnet unit disposed in an AF unit that includes a movable AF unit and a fixed AF unit and an OIS coil unit disposed separately in the direction of the optical axis with respect to the OIS magnet unit and carries out shake correction. The AF drive unit has an elastic support unit that connects the movable AF unit with the fixed AF unit. The movable AF unit is sup- (Continued)

ported movably both ways in the direction of the optical axis by an elastic member.

8 Claims, 10 Drawing Sheets

(51) Int. Cl.
 *G02B 7/04* (2006.01)
 *G03B 5/00* (2006.01)
 *H04N 5/225* (2006.01)

(56) References Cited

U.S. PATENT DOCUMENTS

| 2013/0215526 | A1 | | 8/2013 | Park |
| 2014/0192428 | A1 | | 7/2014 | Park |
| 2017/0371127 | A1 | * | 12/2017 | Murakami ......... H04N 5/23264 |

FOREIGN PATENT DOCUMENTS

| EP | 2899579 | A2 | | 7/2015 |
| JP | 2007-248964 | A | | 9/2007 |
| JP | 2009-150922 | A | | 7/2009 |
| JP | 2009-282090 | A | | 12/2009 |
| JP | 2011-232707 | A | | 11/2011 |
| JP | 2012-088534 | A | | 5/2012 |
| JP | 2013-085331 | A | | 5/2013 |
| JP | 2013085331 | A | * | 5/2013 |
| JP | 2013-210550 | A | | 10/2013 |
| JP | 2013-541319 | A | | 11/2013 |
| WO | 2009/060937 | A1 | | 5/2009 |

OTHER PUBLICATIONS

Extended European Search Report for EP Patent Application No. 15792416.8, dated Dec. 6, 2017.

* cited by examiner

LENS DRIVE DEVICE, CAMERA MODULE, AND MOBILE TERMINAL WITH CAMERA

TECHNICAL FIELD

The present invention relates to a lens driving device for auto focus and shake correction, and a camera module and a camera-equipped mobile terminal having an auto focus function and a shake correction function.

BACKGROUND ART

In general, a small-sized camera module is mounted in mobile terminals such as a smartphone. As such a camera module, a lens driving device (for example PTL 1) is employed. The lens driving device has an auto focus function of automatically performing focusing for capturing a subject (hereinafter referred to as "AF (Auto Focus) function"), and a shake correction function (hereinafter referred to as "OIS (Optical Image Stabilization) function") of optically correcting hand shake (vibration) upon capturing an image to reduce the irregularities of the image.

The auto-focusing and shake-correcting lens driving device includes an auto-focusing driving part (hereinafter referred to as "AF driving part") for moving the lens part in the light axis direction, and a shake-correcting driving part (hereinafter referred to as "OIS driving part") for swaying the lens part in a plane orthogonal to the light axis direction.

The AF driving part includes, for example, an auto-focusing coil part (hereinafter referred to as "AF coil part") disposed around the lens part, and an auto-focusing magnet part (hereinafter referred to as "AF magnet part") disposed separately from the AF coil part in the radial direction. An auto-focusing movable part (hereinafter referred to as "AF movable part") including the lens part and the AF coil part is moved with respect to an auto-focusing fixing part (hereinafter referred to as "AF fixing part") including the AF magnet part in the light axis direction by use of a driving force of a voice coil motor composed of the AF coil part and the AF magnet part, and thus focusing is automatically performed. In the following, the AF movable part and the AF fixing part are collectively referred to as "auto-focusing unit (AF unit)."

Here, a lens position for bringing a subject at a smallest capture distance (a position on the most light reception side) into focus is called "macro position," and a lens position for bringing a subject at the infinity (a position on the most imaging side) into focus is called "infinity position." That is, the range from the macro position to the infinity position is the movable range of the AF movable part.

The OIS driving part includes, for example, an OIS magnet part disposed in the AF unit, and an OIS coil part disposed separately from the OIS magnet part in the light axis direction. The OIS movable part (the AF unit and the OIS magnet part) is supported by a supporting member separately from the OIS fixing part (OIS coil part) in the light axis direction. The OIS movable part is swayed in a plane orthogonal to the light axis direction by use of a driving force of a voice coil motor composed of the OIS magnet part and the OIS coil part, and thus shake correction is performed.

The OIS magnet part may also serve as the AF magnet part, and with such a configuration, the size and the height of the lens driving device can be reduced.

In the lens driving device disclosed in PTL 1, an elastic supporting part (an upper leaf spring and a lower leaf spring) connects a lens holder (as a part of the AF movable part) in which the AF coil part is disposed at the outer peripheral surface, with a magnet holder (as a part of AF fixing part) in which the AF magnet part (also serve as the OIS magnet part) is disposed. At the time of focusing, the AF movable part moves in the light axis direction until the driving force (driving power) of the voice coil motor of the AF driving part and the restoration force of the elastic supporting part are equivalent to each other, and the AF movable part is held in that state. Accordingly, a driving force corresponding to the restoration force of the lower leaf spring and the upper leaf spring in the maximum displacement state is required for the voice coil motor of the AF driving part.

In addition, in the lens driving device disclosed in PTL 1, a spacer is disposed to the lower leaf spring on the imaging side in order to limit the movement of the AF movable part toward the imaging side in the light axis direction. Thus, in the lens driving device disclosed in PTL 1, in an non-energization state where focusing is not performed, the AF movable part is biased, with the back tension of the upper leaf spring and the lower leaf spring, to the spacer side and is brought to the closest position (see FIG. 2 of PTL 1). That is, the AF movable part is held at the infinity position in a non-energization state where focusing is not performed, and is moved toward the macro position in an energization state where focusing is performed.

CITATION LIST

Patent Literature

PTL 1
Japanese Patent Application Laid-Open No. 2013-210550

SUMMARY OF INVENTION

Technical Problem

In recent years, along with reduction in thickness of mobile terminals, further downsizing and power saving of camera modules are desired. With the above-described conventional structure, however, it is difficult to achieve further downsizing and power saving of camera modules. In addition, it is not easy to employ the increasingly improving function of mobile terminals (rising magnification of camera modules).

An object of the present invention is to provide a lens driving device which can achieve further downsizing and power saving, and a camera module and a camera-equipped mobile terminal including the same.

Solution to Problem

A lens driving device according to an embodiment of the present invention includes: an auto-focusing driving part including an auto-focusing coil part disposed around a lens part, and an auto-focusing magnet part disposed separately from the auto-focusing coil part in a radial direction, the auto-focusing driving part being configured to automatically perform focusing by moving an auto-focusing movable part including the auto-focusing coil part in a light axis direction with respect to an auto-focusing fixing part including the auto-focusing magnet part by use of a driving force of a voice coil motor composed of the auto-focusing coil part and the auto-focusing magnet part; and a shake-correcting driving part including a shake-correcting magnet part disposed at an auto-focusing unit having the auto-focusing movable part and the auto-focusing fixing part, and a shake-correcting coil part disposed separately from the shake-correcting magnet part in the light axis direction, the shake-correcting driving part being configured to perform shake correction by swaying a shake correction movable part including the shake-correcting magnet part in a plane orthogonal to the light axis direction with respect to a shake correction fixing part including the shake-correcting coil part by use of a driving force of a voice coil motor composed of the shake-correcting coil part and the shake-correcting magnet part. The auto-focusing driving part includes an elastic supporting part configured to connect the auto-focusing movable part and the auto-focusing fixing part; and the auto-focusing movable part is supported by the elastic supporting part such that the auto-focusing movable part is movable in the light axis direction.

A camera module according to an embodiment of the present invention includes: the above-mentioned lens driving device; a lens part that is mounted in the auto-focusing movable part; and an image capturing part configured to capture a subject image imaged with the lens part.

A camera-equipped mobile terminal according to an embodiment of the present invention includes: the above-mentioned camera module.

Advantageous Effects of Invention

According to the embodiment of the present invention, at the time of focusing, the AF movable part can move in the light axis direction, and therefore even with the movable range of the AF movable part (the range from the infinity position to the macro position), the movement amount of the AF movable part is small, and the displacement amount of the elastic supporting part (the maximum displacement amount and the integrated displacement amount) is obviously small in comparison with the conventional lens driving device. Accordingly, power consumption at the time of focusing can be reduced, and thus further power saving can be achieved. In addition, since the size of the voice coil motor of the AF driving part (the AF coil part and the magnet part) can be reduced, further downsizing can be achieved.

DESCRIPTION OF EMBODIMENT

In the following, an embodiment of the present invention is described in detail with reference to the drawings.

Figure 1A:
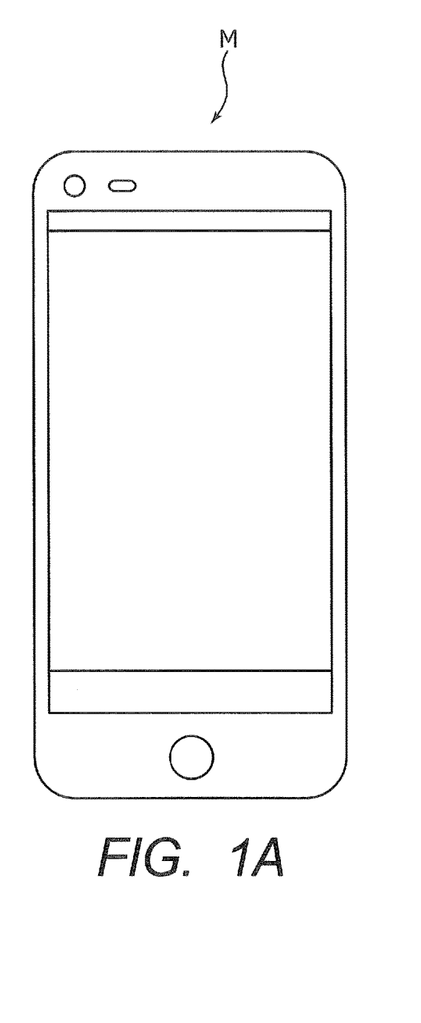
FIGS. 1A and 1B illustrate a smartphone in which a camera module according to an embodiment of the present invention is mounted.
Figure 1B:
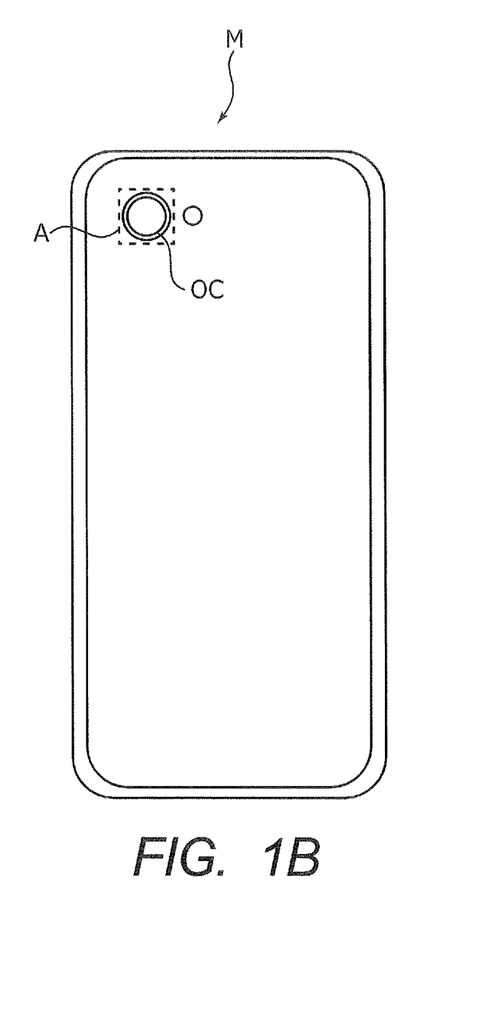

FIGS. 1A and 1B illustrate smartphone M in which camera module A according to the embodiment of the present invention is mounted. FIG. 1A is a front view of smartphone M, and FIG. 1B is a rear view of smartphone M.

For example, smartphone M is provided with camera module A as a back side camera OC. Camera module A has an auto focus function and a shake correction function, and can capture an image without image blurring by automatically performing focusing at the time of capturing a subject and by optically correcting hand shake (vibration) caused at the time of capturing an image.

Figure 2:
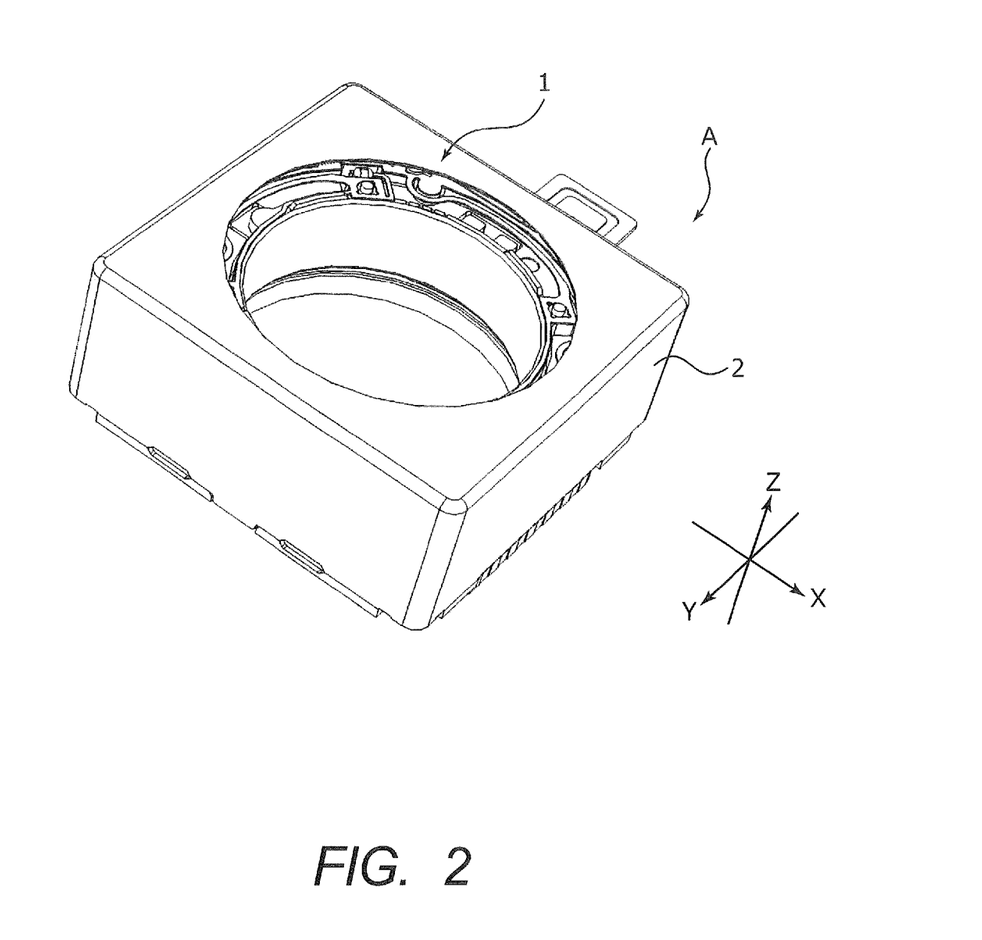
FIG. 2 is a perspective view of an external appearance of the camera module.
Figure 3:
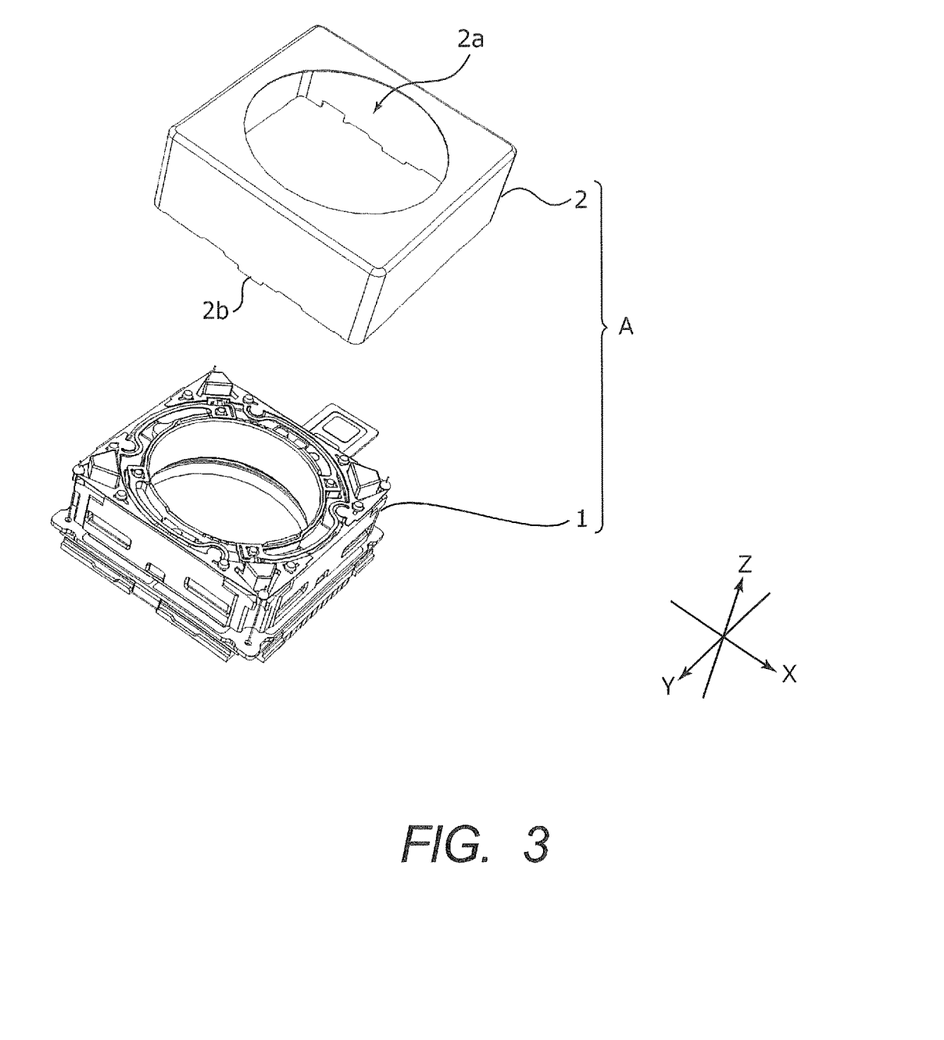
FIG. 3 is an exploded perspective view of the camera module.

FIG. 2 is a perspective view of an external appearance of camera module A. FIG. 3 is an exploded perspective view of camera module A.

As illustrated in FIG. 2 and FIG. 3, descriptions will be made with an orthogonal coordinate system (X, Y, Z) in the present embodiment. Also in FIG. 4 to FIG. 10 described later, descriptions will be made with an orthogonal coordinate system (X, Y, Z). Camera module A is mounted such that the vertical direction (or horizontal direction) is the X direction, the horizontal direction (or vertical direction) is the Y direction, and the front-rear direction is the Z direction at the time of actually capturing an image with smartphone M. That is, the Z direction is the light axis direction, the upper side in the drawing is the light reception side in the light axis direction (also referred to as "macro position side"), and the lower side is the imaging side in the light axis direction (also referred to as "infinity position side").

Camera module A includes a lens part (not illustrated) in which a lens is housed in a lens barrel having a cylindrical shape, auto-focusing and shake-correcting lens driving device 1, an image capturing part (not illustrated) that captures a subject image imaged with the lens part, shield cover 2 that covers the entirety, and the like.

As viewed in the light axis direction, shield cover 2 is a capped square cylindrical body having a square shape in plan view. Circular opening 2a is formed in the top surface of shield cover 2. A lens part (not illustrated) is exposed to the outside through opening 2a. Shield cover 2 includes, at the bottom part, engagement piece 2b for mounting to lens driving device 1 (base member 23). Engagement piece 2b protrudes downward from the bottom part of shield cover 2.

The image capturing part (not illustrated) includes an imaging device (not illustrated), and is disposed on the imaging side in the light axis direction of the lens driving device 1. The imaging device (not illustrated) is composed of, for example, a CCD (charge coupled device) image sensor, a CMOS (complementary metal oxide semiconductor) image sensor, or the like. The imaging device (not illustrated) captures a subject image imaged by a lens part (not illustrated).

Figure 4:
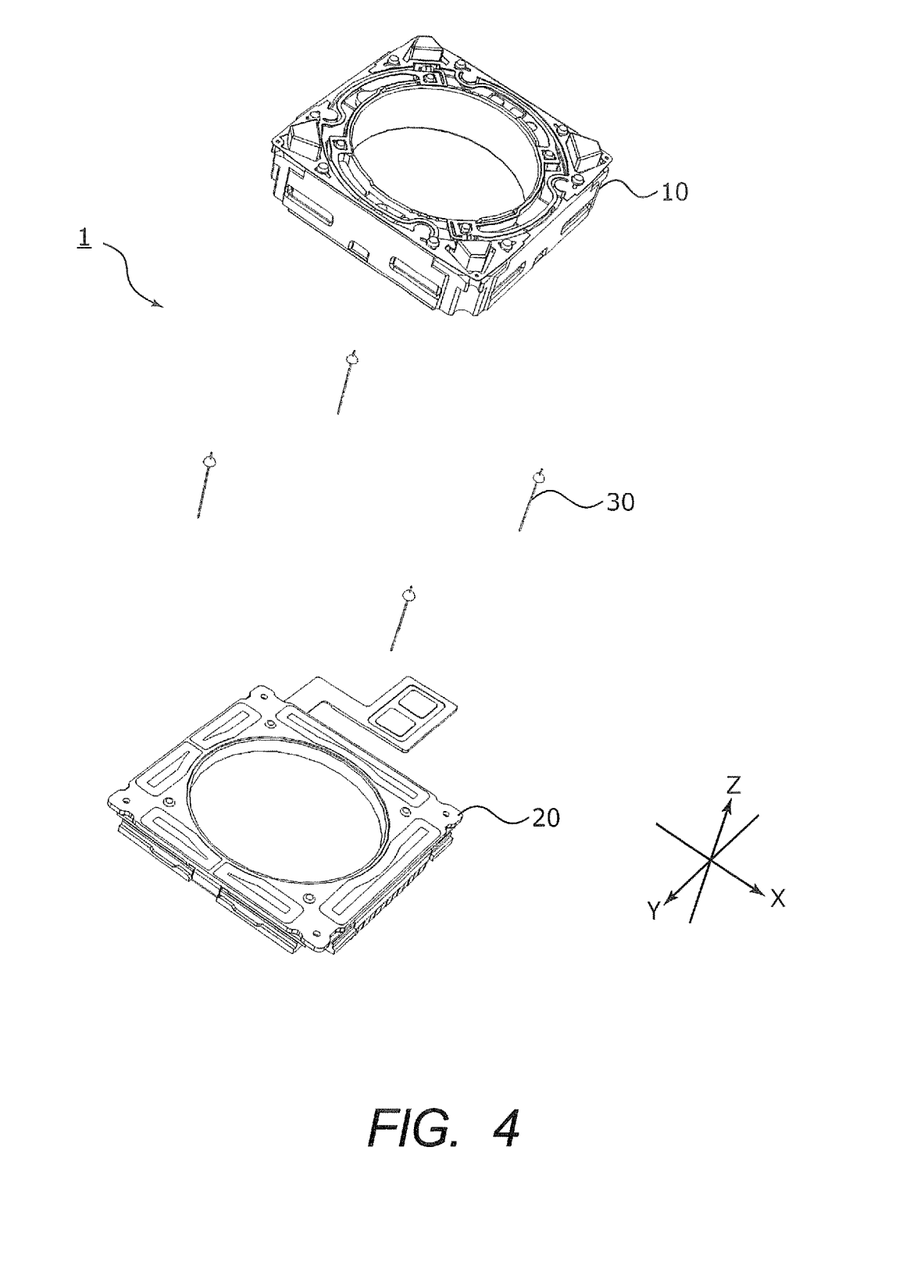
FIG. 4 is an exploded perspective view of a lens driving device.

FIG. 4 is an exploded perspective view of lens driving device 1.

As illustrated in FIG. 4, lens driving device 1 includes OIS movable part 10, OIS fixing part 20, supporting member 30 and the like. OIS movable part 10 is a part that includes one of an OIS coil part and an OIS magnet part for forming the OIS voice coil motor, and sways in the XY plane at the time of shake correction. OIS fixing part 20 is a part that includes the other of the OIS coil part and the OIS magnet part. In the present embodiment, the OIS magnet part is disposed in OIS movable part 10, and the OIS coil part is disposed in OIS fixing part 20. In addition, OIS movable part 10 is the "AF unit" including the AF driving part.

OIS movable part 10 is disposed on the light reception side in the light axis direction relative to OIS fixing part 20 and is separated from OIS fixing part 20. OIS movable part 10 is coupled with OIS fixing part 20 by supporting member 30. To be more specific, supporting member 30 is composed of four suspension wires extending along the Z direction (hereinafter referred to as "suspension wire 30"). One end (upper end) of suspension wire 30 is fixed to OIS movable part 10 (upper elastic supporting part 13), and the other end (lower end) of suspension wire 30 is fixed to OIS fixing part 20 (coil substrate 21). OIS movable part 10 is supported by suspension wire 30 such that OIS movable part 10 can sway in the XY plane.

It is to be noted that two of the four suspension wires 30 are used for feeding power to AF coil part 112. In addition, the number of suspension wires 30 is not limited to four as long as a plurality of suspension wires 30 are provided.

Figure 5:
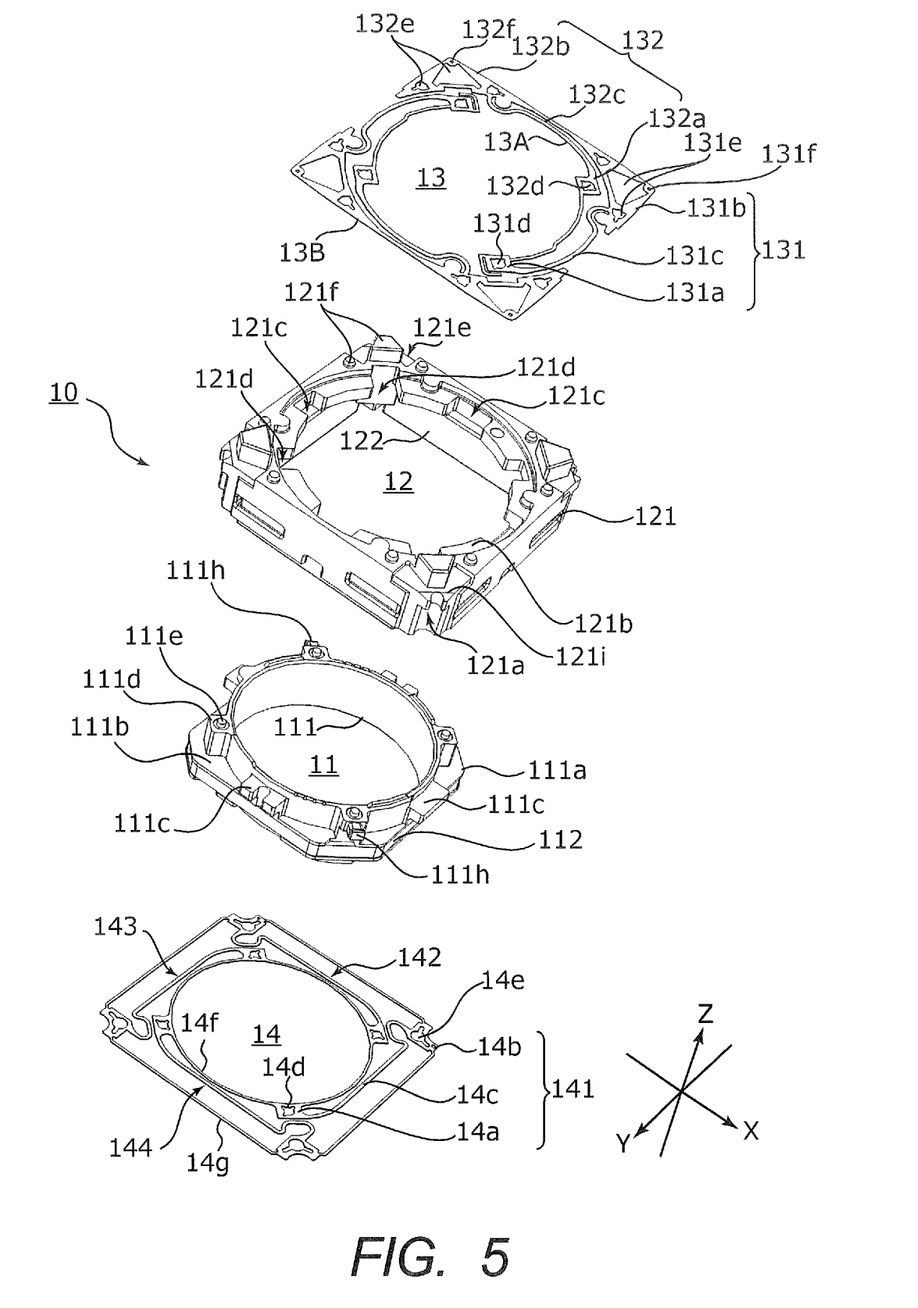
FIG. 5 is an exploded perspective view of an OIS movable part.
Figure 6:
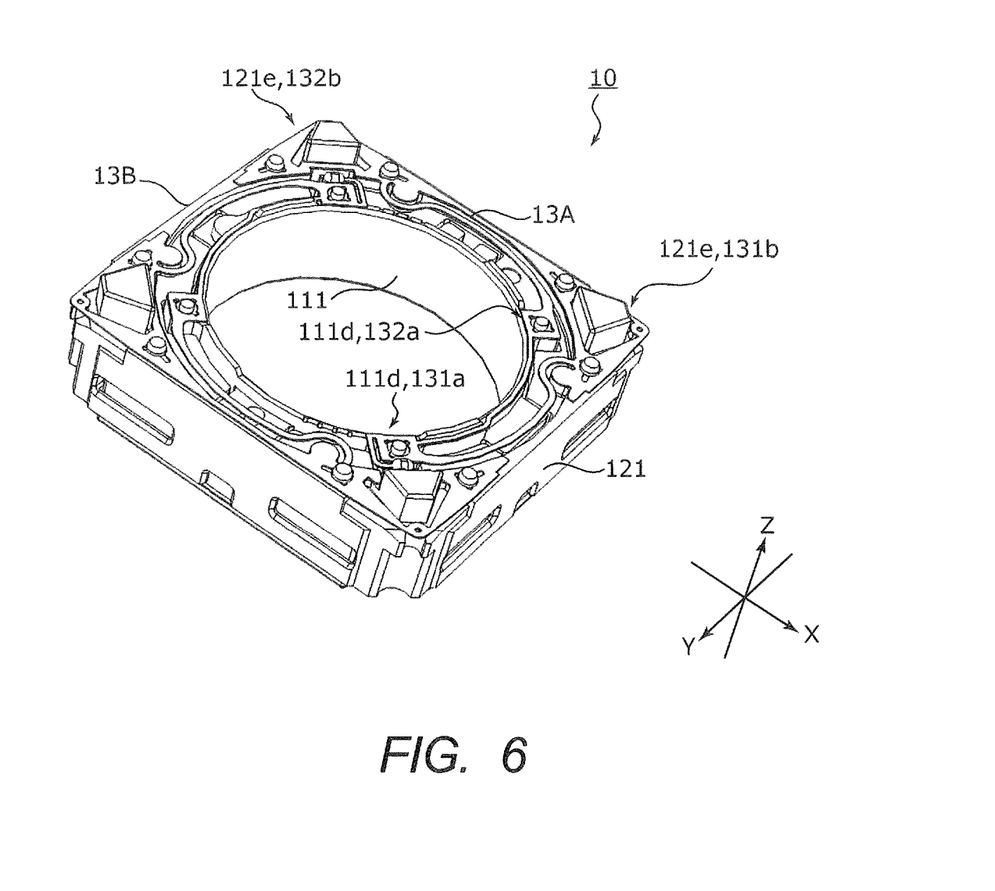
FIG. 6 is a perspective view of an upper side of the OIS movable part.
Figure 7:
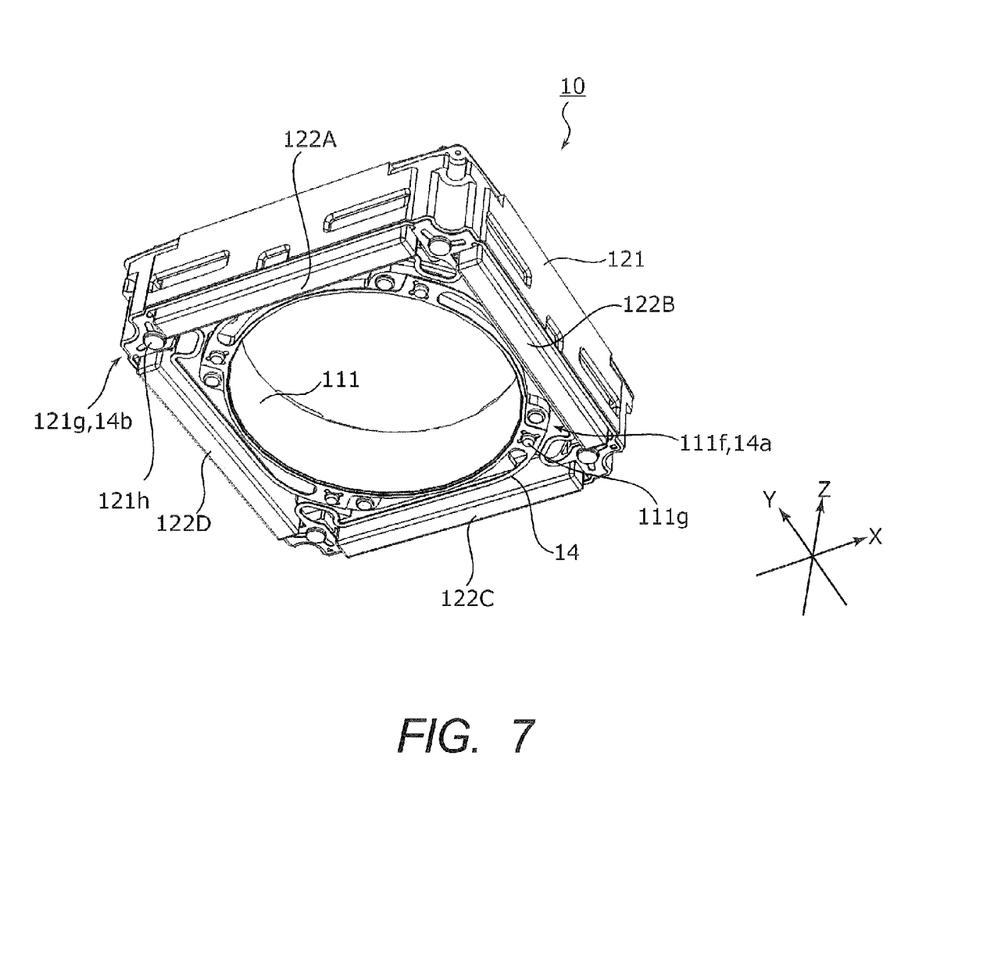
FIG. 7 is a perspective view of a lower side of the OIS movable part.

FIG. 5 is an exploded perspective view of OIS movable part 10. FIG. 6 is a perspective view of an upper side of OIS movable part 10. FIG. 7 is a perspective view of a lower side of OIS movable part 10.

As illustrated in FIG. 5 to FIG. 7, OIS movable part 10 includes AF movable part 11, AF fixing part 12, upper elastic supporting part 13, lower elastic supporting part 14 and the like. AF movable part 11 includes one of the AF coil part and the AF magnet part for forming the AF voice coil motor, and moves at the time of focusing in the light axis direction. AF fixing part 12 includes the other of the AF coil part and the AF magnet part.

In the present embodiment, the AF coil part is disposed in AF movable part 11, and the AF magnet part is disposed in AF fixing part 12. AF movable part 11 is disposed on the radially inside relative to AF fixing part 12 and is separated from AF fixing part 12. AF movable part 11 is coupled with AF fixing part 12 by upper elastic supporting part 13 and lower elastic supporting part 14.

AF movable part 11 includes lens holder 111 and AF coil part 112.

Lens holder 111 is a member having a cylindrical shape, and a lens part (not illustrated) is fixed on the inner peripheral surface by bonding or screwing.

Lens holder 111 includes, at the lower half portion of the peripheral surface, coil winding part 111a having a chamfered quadrangular shape. Flat surface 111b of coil winding part 111a serves as a locking part (hereinafter referred to as "first locking part 111b") for limiting the movement of AF movable part 11 toward the light reception side in the light axis direction.

Lens holder 111 includes, at four portions intersecting the X direction and the Y direction (hereinafter referred to as "cross direction") of the upper half portion of the peripheral surface, protruding parts 111c that radially outwardly protrude. Protruding parts 111c serve as locking parts (hereinafter referred to as "second locking parts 111c") for limiting the movement of AF movable part 11 toward the imaging side in the light axis direction. Second locking parts 111c radially outwardly protrude over coil winding part 111a.

Lens holder 111 includes, at four portions intersecting the directions (hereinafter referred to as "diagonal direction") rotated by 45 degrees from the cross direction of the upper half portion of the peripheral surface, protruding parts 111d. Protruding parts 111d serve as upper spring fixing parts (hereinafter referred to as "upper spring fixing parts 111d") for fixing upper elastic supporting part 13.

Upper bosses 111e for positioning and fixing upper elastic supporting part 13 are disposed at upper spring fixing parts 111d. In addition, tying parts 111h that radially outwardly protrude are disposed at two opposite upper spring fixing parts 111d of the four upper spring fixing parts 111d.

Lens holder 111 includes, at the four corners of the bottom surface, lower spring fixing parts 111f for fixing lower elastic supporting part 14. Lower bosses 111g for positioning and fixing lower elastic supporting part 14 are disposed at lower spring fixing parts 111f.

AF coil part 112 is an air-core coil that is energized at the time of focusing, and is wound around the outer peripheral surface of coil winding part 111a of lens holder 111. One end of AF coil part 112 is tied to one tying part 111h, and the other end of AF coil part 112 is tied to the other tying part 111h.

AF fixing part 12 includes magnet holder 121 and magnet part 122. While FIG. 5 illustrates a state where magnet holder 121 is attached on magnet part 122, magnet part 122 is attached after AF movable part 11 is inserted to magnet holder 121 in practice.

Magnet holder 121 has a quadrangular cylindrical shape which is square in plan view. Four connection parts (four sides extending along the Z-axis direction) connecting the side walls of magnet holder 121 are curved to radially inside (curved parts 121a). Suspension wires 30 are disposed at curved parts 121a.

Magnet holder 121 includes, at the upper part, stopper parts 121b that protrude to radially inside in a ring-shape. Stopper parts 121b include first cutout parts 121c at the four portions intersecting the cross direction, and second cutout parts 121d at the four portions intersecting diagonal direction.

First cutout parts 121c correspond to second locking parts 111c of lens holder 111, and second cutout parts 121d correspond to upper spring fixing parts 111d of lens holder 111.

Magnet holder 121 includes, at the four corners of the top surface, upper spring fixing parts 121e that fix upper elastic supporting part 13. Upper bosses 121f for fixing and positioning upper elastic supporting part 13 are disposed at upper spring fixing parts 121e. The portion around upper boss 121f having a trapezoidal columnar shape is slightly recessed relative to the top surface of magnet holder 121 (damper installation part 121i) such that a gap is formed when upper leaf springs 13A and 13B are attached thereto. The corner portion of damper installation part 121i (the upper part of curved parts 121a) protrudes to the outside relative to the lower part.

Magnet holder 121 includes, at the four corners of the bottom surface, lower spring fixing parts 121g that fix lower elastic supporting part 14. Lower bosses 121h for fixing and positioning lower elastic supporting part 14 are disposed at lower spring fixing parts 121g.

Magnet part 122 includes four cuboid permanent magnets 122A to 122D. Permanent magnets 122A to 122D are disposed along the internal surfaces of the four side walls of magnet holder 121. Permanent magnets 122A and 122C are disposed to face each other in the Y direction, and permanent magnets 122B and 122D are disposed to face each other in the X direction. Permanent magnets 122A to 122D are magnetized such that a magnetic field orthogonal to the radial direction is formed at AF coil part 112. For example, permanent magnets 122A to 122D are magnetized such that the inner periphery side and the outer periphery side thereof are set to N pole and S pole, respectively.

The AF voice coil motor is composed of magnet part 122 and AF coil part 112. In the present embodiment, magnet part 122 serves as the AF magnet part and as the OIS magnet part.

Upper elastic supporting part 13 is a leaf spring made of beryllium copper, nickel copper, stainless steel or the like for example, and is composed of two members 13A and 13B having the same shape (hereinafter referred to as "upper leaf springs 13A and 13B"). Upper leaf springs 13A and 13B are point symmetrical about the optical axis, and upper elastic supporting part 13 has a square shape in plan view in its entirety.

Each of upper leaf springs 13A and 13B includes spring parts 131 and 132. Spring part 131 includes lens holder fixing part 131a that is fixed to lens holder 111, magnet holder fixing part 131b that is disposed at a position rotated by 90 degrees from lens holder fixing part 131a and is fixed to magnet holder 121, and arm part 131c that couples lens holder fixing part 131a and magnet holder fixing part 131b. Likewise, spring part 132 includes lens holder fixing part 132a, magnet holder fixing part 132b, and arm part 132c. Lens holder fixing parts 131a and 132a are coupled at a position on the inside of arm part 131c, and magnet holder fixing parts 131b and 132b are coupled at a position on the outside of arm part 132c.

Lens holder fixing parts 131a and 132a include fixation holes 131d and 132d corresponding to upper bosses 111e of lens holder 111. Magnet holder fixing parts 131b and 132b include fixation holes 131e and 132e corresponding to upper bosses 121f of magnet holder 121.

In addition, magnet holder fixing parts 131b and 132b include wire fixation holes 131f and 132f through which one end of suspension wire 30 is inserted. The portions where wire fixation holes 131f and 132f are formed are formed such that the portions are easily elastically deformed. The drop impact is absorbed by deflection of the portions where wire fixation holes 131f and 132f are formed and suspension wire 30, and therefore plastic deformation or rupture of suspension wire 30 does not occur.

As with upper elastic supporting part 13, lower elastic supporting part 14 is a leaf spring made of beryllium copper, nickel copper, stainless-steel or the like (hereinafter referred to as "lower leaf spring 14"). Lower leaf spring 14 includes four spring parts 141 to 144. Each of spring parts 141 to 144 includes lens holder fixing part 14a that is fixed to lens holder 111, magnet holder fixing part 14b that is disposed at a position rotated by 90 degrees from lens holder fixing part 14a and is fixed to magnet holder 121, and arm part 14c that couples lens holder fixing part 14a and magnet holder fixing part 14b.

Lens holder fixing parts 14a adjacent to each other are coupled by inner ring part 14f at a position on the inside of arm part 14c. Magnet holder fixing parts 14b adjacent to each other are coupled by outer ring part 14g at a position on the outside of arm part 14c.

Lens holder fixing part 14a includes fixation hole 14d corresponding to lower boss 111g of lens holder 111. Magnet holder fixing part 14b includes fixation hole 14e corresponding to lower boss 121h of magnet holder 121.

At the time of assembling OIS movable part 10, first, magnet holder fixing parts 131b and 132b of upper leaf springs 13A and 13B are attached to upper spring fixing parts 121e of magnet holder 121. In addition, lens holder fixing parts 14a of lower leaf spring 14 are attached to lower spring fixing parts 111f of lens holder 111.

Next, lens holder 111 is fitted into magnet holder 121 from the imaging side in the light axis direction. At this time, second locking parts 111c of lens holder 111 are fitted to first cutout parts 121c of magnet holder 121, and upper spring fixing parts 111d are fitted to second cutout parts 121d. Then, lens holder fixing parts 131a and 132a of upper leaf springs 13A and 13B are attached to upper spring fixing parts 111d of lens holder 111. Lens holder fixing part 131 a is bonded by soldering to one end and the other end of AF coil part 112 tied to tying part 111h of lens holder 111, so as to be electrically connected. In addition, magnet holder fixing parts 14b of lower leaf spring 14 are attached to lower spring fixing parts 121g of magnet holder 121.

Next, permanent magnets 122A to 122D are inserted from the region surrounded by arm part 14c and outer ring part 14g of lower leaf spring 14, and are bonded to magnet holder 121. In this manner, OIS movable part 10 (AF driving part) is assembled.

Figure 8:
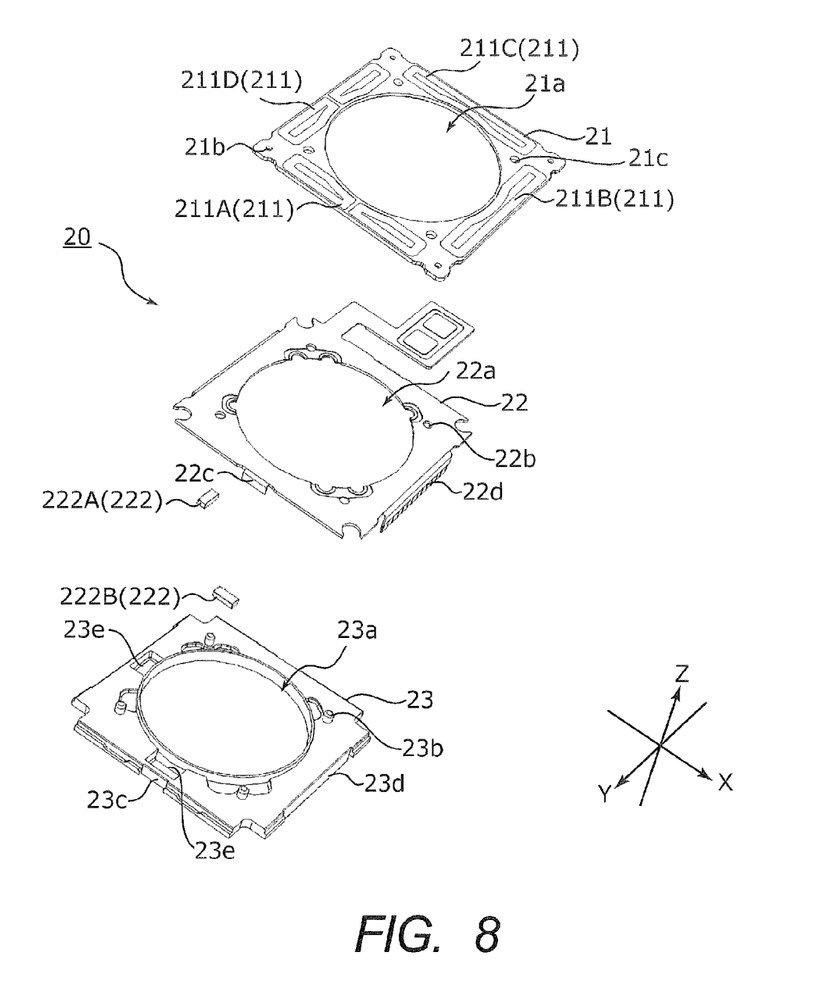
FIG. 8 is an exploded perspective view of an OIS fixing part.

FIG. 8 is an exploded perspective view of OIS fixing part 20.

As illustrated in FIG. 8, OIS fixing part 20 includes coil substrate 21, sensor substrate 22, base member 23 and the like.

In plan view, coil substrate 21 has a square shape, and has circular opening 21a at a center portion. Coil substrate 21 includes, at the four corners, wire fixation holes 21b through which the other end (lower end) of suspension wire 30 is inserted. In addition, coil substrate 21 includes, at positions which intersect the diagonal direction of peripheral portions of opening 21a, positioning holes 21c.

Coil substrate 21 includes OIS coil part 211 at a position opposite to magnet part 122 in the light axis direction. OIS coil part 211 includes four OIS coils 211A to 211D corresponding to permanent magnets 122A to 122D. The sizes and positions of OIS coils 211A to 211D and permanent magnets 122A to 122D are set such that the magnetic field radiated from the bottom surfaces of permanent magnets 122A to 122D traverses the long side portions of OIS coils 211A to 211D in the Z direction. The OIS voice coil motor is composed of magnet part 122 and OIS coil part 211.

As with coil substrate 21, sensor substrate 22 has a square shape in plan view, and has circular opening 22a at a center portion. Sensor substrate 22 includes, at peripheral portions of opening 22a, positioning holes 22b at positions corresponding to positioning holes 21c of coil substrate 21. Sensor substrate 22 includes, at the two sides along the X direction, first lock pieces 22c that are bent downward. In addition, sensor substrate 22 includes, at the two sides along the Y direction, second lock pieces 22d that are bent downward.

Sensor substrate 22 includes position detection part 222 that detects the position of OIS movable part 10 in the XY plane, a power-source line (not illustrated) for supplying power to AF coil part 112 and OIS coil part 211, and a signal line for detection signals (not illustrated) output from position detection part 222.

Position detection part 222 is composed of Hall devices 222A and 222B (magnetic sensors) that detect the magnetic field by utilizing Hall effect, for example. Hall devices 222A and 222B are disposed at respective adjacent two sides of the bottom surface of sensor substrate 22 at an approximate center thereof. By detecting the magnetic field formed by magnet part 122 with Hall devices 222A and 222B, the position of OIS movable part 10 in the XY plane can be specified. It is to be noted that a magnet for position detection may be disposed independently of magnet part 122 in OIS movable part 10.

As with coil substrate 21, base member 23 has a square shape in plan view, and has circular opening 23a at a center portion. Base member 23 includes, at peripheral portions of opening 23a, positioning bosses 23b at positions corresponding to positioning holes 21c of coil substrate 21 and positioning holes 22b of sensor substrate 22. In addition, base member 23 includes, at peripheral portions of opening 23a, Hall device housing parts 23e at positions corresponding to Hall devices 222A and 222B. In addition, base member 23 includes, at the side walls, small recesses 23c at positions corresponding to first lock pieces 22c of sensor substrate 22, and large recesses 23d at positions corresponding to second lock pieces 22d of sensor substrate 22. Small recesses 23c and large recesses 23d are formed in a tapered shape which expands downward.

At the time of assembling OIS fixing part 20, first, coil substrate 21 and sensor substrate 22 are bonded by soldering. In this manner, the power-source line (not illustrated) of sensor substrate 22 and OIS coil part 211 are electrically connected to each other.

Next, positioning holes 21c of coil substrate 21 and positioning holes 22b of sensor substrate 22 are fitted to positioning bosses 23b of base member 23 to dispose coil substrate 21 and sensor substrate 22 on base member 23. First lock pieces 22c of sensor substrate 22 are engaged with small recesses 23c of base member 23, and second lock pieces 22d of sensor substrate 22 are engaged with large recesses 23d, and thus, coil substrate 21 and sensor substrate 22 are fixed to base member 23. In this manner, OIS fixing part 20 are assembled.

At the time of assembling lens driving device 1, one end (upper end) of suspension wire 30 is inserted to wire fixation holes 131f and 132f of upper leaf springs 13A and 13B and is fixed by soldering. In this manner, suspension wire 30 and upper leaf springs 13A and 13B are electrically connected to each other.

In addition, the other end (lower end) of suspension wire 30 is inserted to wire fixation hole 21b of coil substrate 21, and is fixed by soldering. In this manner, the power-source line of sensor substrate 22 and suspension wire 30 are electrically connected to each other. Through suspension wire 30 and upper leaf springs 13A and 13B, power can be fed to AF coil part 112.

In addition, a damper (not illustrated) is disposed at damper installation part 121i (including the inside of the protruding portion) of magnet holder 121 in such a manner as to surround suspension wire 30. Thus the damper is interposed between magnet holder 121 and upper leaf springs 13A and 13B. The damper can be readily applied to damper installation part 121i with use of a dispenser. For example, ultraviolet curing silicone gel can be adopted as the damper.

By interposing the damper (not illustrated) between magnet holder 121 and upper leaf springs 13A and 13B, generation of unnecessary resonance (high-order resonance mode) can be reduced, and consequently, the stability of the operation can be ensured.

Shield cover 2 is attached to lens driving device 1 in such a manner that engagement piece 2b of shield cover 2 makes contact with first lock piece 22c of sensor substrate 22. Since small recess 23c of base member 23 has a tapered shape, a biasing force acts between first lock piece 22c of sensor substrate 22 and engagement piece 2b of shield cover 2. Accordingly, shield cover 2 and sensor substrate 22 are electrically connected to each other without soldering. In this manner, shield cover 2 can be readily grounded, and EMC noise can be blocked.

When performing shake correction in lens driving device 1, OIS coil part 211 is energized. The energization current supplied through OIS coil part 211 is controlled by an external control part (not illustrated). When OIS coil part 211 is energized, a Lorentz force is generated at OIS coil part 211 by interaction between the magnetic field of magnet part 122 and the current flowing through OIS coil part 211 (Fleming's left hand rule). The direction of the Lorentz force is the direction (the Y direction or the X direction) orthogonal to the direction of the magnetic field (the Z direction) and the direction of the current flowing through the long side portion of OIS coil part 211 (the X direction or the Y direction). Since OIS coil part 211 is fixed, a reactive force acts on magnet part 122. With this reactive force serving as the driving force of the OIS voice coil motor, OIS movable part 10 having magnet part 122 sways in the XY plane, and thus shake correction is performed.

When performing automatic focusing in lens driving device 1, AF coil part 112 is energized. The energization current supplied through AF coil part 112 is controlled by an external control part (not illustrated). When AF coil part 112 is energized, a Lorentz force is generated at AF coil part 112 by interaction between the magnetic field of magnet part 122 and the current flowing through AF coil part 112. The direction of the Lorentz force is a direction (the Z direction) orthogonal to the direction of the magnetic field (X direction or Y direction) and the direction of the current flowing through the AF coil part 211 (the Y direction or the X direction). Since magnet part 122 is fixed, a reactive force acts on AF coil part 112. With this reactive force serving as the driving force of the AF voice coil motor, AF movable part 11 having AF coil part 112 moves in the light axis direction, and thus focusing is performed.

Here, in an non-energization state where focusing is not performed, AF movable part 11 is suspended between the infinity position and the macro position with upper leaf springs 13A and 13B and lower leaf spring 14 (hereinafter referred to as "reference state"). That is, in OIS movable part 10, AF movable part 11 (lens holder 111) is elastically supported such that AF movable part 11 is displaceable in the Z direction in the state where the position of AF movable part 11 with respect to AF fixing part 12 (magnet holder 121) is set by upper leaf springs 13A and 13B, and lower leaf spring 14.

At the time of focusing, the direction of the current is controlled based on whether AF movable part 11 is moved from the reference state toward the macro position side or to the infinity position side. In addition, the value of the current is controlled in accordance with the movement length of AF movable part 11.

Figure 9:
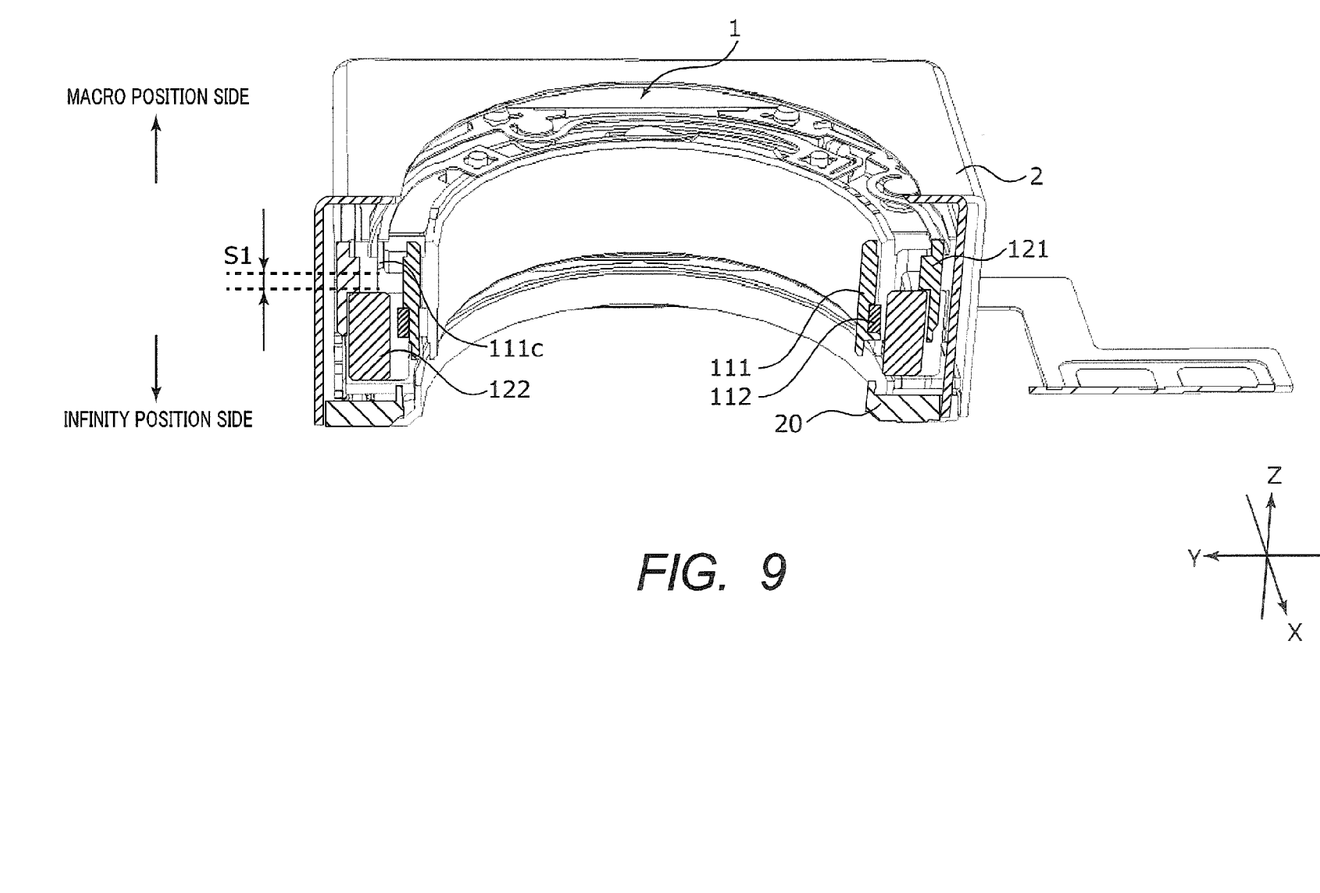
FIG. 9 is a perspective sectional view of a structure of a first stopper in the camera module.

FIG. 9 is a perspective sectional view of a stopper structure for limiting the movement of AF movable part 11 toward the infinity position side. FIG. 9 illustrates a case where AF movable part 11 is in a reference state.

As illustrated in FIG. 9, when AF movable part 11 moves to the infinity position side at the time of focusing, second locking part 111c of lens holder 111 approaches the top surface of magnet part 122. Then, second locking part 111c of lens holder 111 makes contact with the top surface of magnet part 122 when AF movable part 11 is moved by stroke S1, and thus the movement is limited. The position where second locking parts 111c of lens holder 111 makes contact with the top surface of magnet part 122 is the infinity position.

Figure 10:
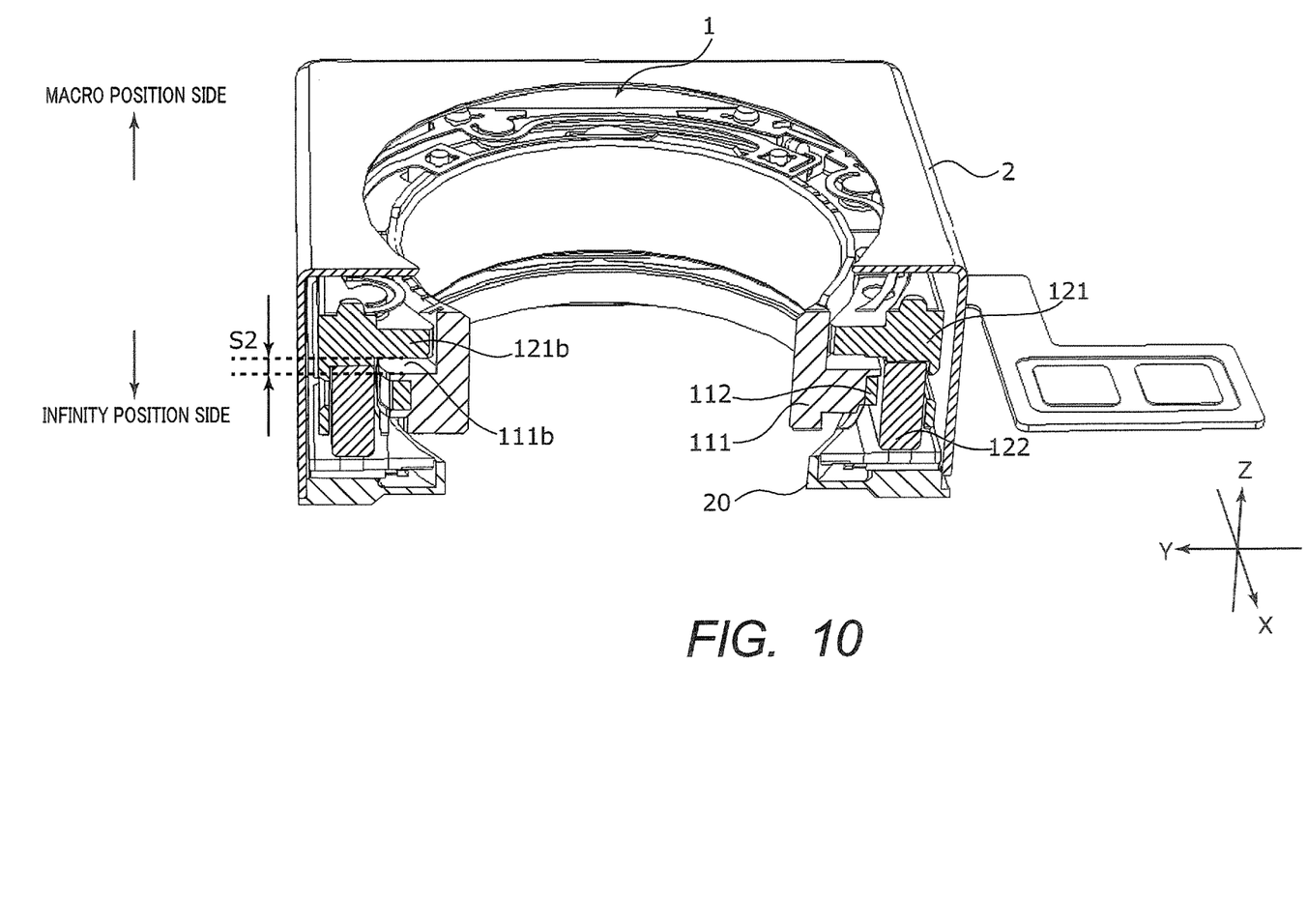
FIG. 10 is a perspective sectional view of a second stopper structure in the camera module.

FIG. 10 is a perspective sectional view illustrating a stopper structure for limiting the movement of AF movable part 11 toward the macro position side. FIG. 10 illustrates AF movable part 11 in the reference state.

As illustrated in FIG. 10, when AF movable part 11 moves to the macro position side at the time of focusing, first locking part 111b of lens holder 111 approaches stopper part 121b of magnet holder 121. Then, first locking part 111b of lens holder 111 makes contact with stopper part 121b of magnet holder 121 when AF movable part 11 is moved by stroke S2, and thus the movement is limited. The position where first locking part 111c of lens holder 111 makes contact with stopper part 121b of magnet holder 121 is the macro position.

As described, Lens driving device 1 according to the present embodiment includes: AF driving part including AF coil part 112 disposed around a lens part, and an AF magnet part disposed separately from AF coil part 112 in a radial direction, the AF driving part being configured to automatically perform focusing by moving AF movable part 11 including AF coil part 112 in a light axis direction with respect to AF fixing part 12 including the AF magnet part by use of a driving force of a voice coil motor composed of AF coil part 112 and the AF magnet part.

In addition, lens driving device 1 also includes: an OIS driving part including OIS magnet part 122 disposed at an AF unit having AF movable part 11 and AF fixing part 12, and OIS coil part 211 disposed separately from OIS magnet part 122 in the light axis direction, the OIS driving part being configured to configured to perform shake correction by swaying OIS movable part 10 including OIS magnet part 122 in a plane orthogonal to the light axis direction with respect to OIS fixing part 20 including OIS coil part 211 by use of a driving force of a voice coil motor composed of OIS coil part 211 and OIS magnet part 122.

The AF driving part includes an elastic supporting part (upper elastic supporting part 13, lower elastic supporting part 14) configured to connect AF movable part 11 and AF fixing part 12; and AF movable part 11 is supported by elastic supporting part 13, 14 such that AF movable part 11 is movable in the light axis direction.

With lens driving device 1, at the time of focusing, AF movable part 11 can move in the light axis direction with the reference state as the center, and therefore even with the movable range of AF movable part 11 (the range from the infinity position to the macro position), the movement amount of AF movable part 11 is small, and the displacement amount of upper elastic supporting part 13 and lower elastic supporting part 14 (the maximum displacement amount and the integrated displacement amount) is obviously small in comparison with the conventional lens driving device (see PTL 1). Accordingly, power consumption at the time of focusing can be reduced, and thus further power saving can be achieved. In addition, since the size of the voice coil motor of the AF driving part (AF coil part 112 and magnet part 122) can be reduced, further downsizing can be achieved. Further, it is not necessary to provide a spacer in the conventional lens driving device, and the number of components can be reduced. As a result, the assembly work can be simplified, and downsizing and height reduction can be achieved.

In addition, AF fixing part 12 includes a stopper part (stopper part 121b, the top surface of magnet part 122) configured to limit movement of AF movable part 11 in the light axis direction; and AF movable part 11 includes locking part (first locking part 111b, second locking parts 111c) that is locked by stopper part 121b, 122.

To be more specific, AF fixing part 12 includes, as stopper part 121b, 122, first stopper part 121b configured to limit movement of AF movable part 11 toward a light reception side in the light axis direction, and a second stopper part (the top surface of magnet part 122) configured to limit movement of AF movable part 11 toward an imaging side in the light axis direction.

AF movable part 11 includes, as the locking part, first locking part 111b that is locked by first stopper part 121b, and second locking part 111c that is locked by second stopper part 121c.

To be more specific, AF fixing part 12 includes magnet holder 121 in which the AF magnet part (magnet part 122) is disposed; and the magnet holder 121 includes at least one of first stopper part 121b and second stopper part 121c.

The AF magnet part (magnet part 122) forms the second stopper part configuration.

AF movable part 11 includes a lens holder in which AF coil part 112 is disposed; and lens holder 111 includes at least one of first locking part 111b and second locking part 111c.

With such a stopper structure, AF movable part 11 can be surely moved within an appropriate movable range. Accordingly, it is possible to prevent a situation where AF movable part 11 makes contact with OIS fixing part 20 due to malfunction or the like and the components are damaged or the OIS function is impaired.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, in the above-mentioned embodiment, magnet holder 121 may be provided with the second stopper part, and magnet part 122 may be provided with the first stopper part. Furthermore, the stopper part and the locking part may be composed of other members.

While a smartphone is described as an example of the camera-equipped mobile terminal in the embodiment, the present invention is also applicable to camera-equipped mobile phones, note-type personal computers, tablet terminals, mobile game machines, webcameras, in-vehicle cameras and the like.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof. Although embodiments of the present invention has been described and illustrated in detail, it is clearly understood that the same is by way of illustrated and example only and is not to be taken by way of limitation, the scope of the present invention being interpreted by terms of the appended claims.

The disclosures of the specification, drawings, and abstract in Japanese Patent Application No. 2014-100730 filed on May 14, 2014 and Japanese Patent Application No. 2014-165994 filed on Aug. 18, 2014 are incorporated herein by reference in its entirety.

REFERENCE SIGNS LIST

1 Lens driving device
2 Shield cover
10 OIS movable part
11 AF movable part
111 Lens holder
112 AF coil part
12 AF fixing part
121 Magnet holder
122 Magnet part (AF magnet part, OIS magnet part)
122A to 122D Permanent magnet
13 Upper elastic supporting part
13A, 13B Upper leaf spring 14 Lower elastic supporting part, lower leaf spring
20 OIS fixing part
21 Coil substrate
211 OIS coil part
211A to 211D OIS coil
22 Sensor substrate
222 Position detection part
222A, 222B Hall device
23 Base member
30 Supporting member
M Smartphone
A Camera module

The invention claimed is:

1. A lens driving device comprising:
an auto-focusing driving part including an auto-focusing coil part disposed around a lens part, and an auto-focusing magnet part disposed separately from the auto-focusing coil part in a radial direction, the auto-focusing driving part being configured to:
automatically perform focusing by moving an auto-focusing movable part including the auto-focusing coil part in a light axis direction with respect to an auto-focusing fixing part including the auto-focusing magnet part by use of a driving force of a voice coil motor composed of the auto-focusing coil part and the auto-focusing magnet part; and
a shake-correcting driving part including a shake-correcting magnet part disposed at an auto-focusing unit having the auto-focusing movable part and the auto-focusing fixing part, and a shake-correcting coil part disposed separately from the shake-correcting magnet part in the light axis direction, the shake-correcting driving part being configured to:
perform shake correction by swaying a shake correction movable part including the shake-correcting magnet part in a plane orthogonal to the light axis direction with respect to a shake correction fixing part including the shake-correcting coil part by use of a driving force of a voice coil motor composed of the shake-correcting coil part and the shake-correcting magnet part, wherein:
the auto-focusing driving part includes an elastic supporting part configured to:
connect the auto-focusing movable part and the auto-focusing fixing part,
the auto-focusing movable part is supported in a suspended state in an non-energization state between the infinity position and the macro position by the elastic supporting part such that the auto-focusing movable part is movable in the light axis direction,
the auto-focusing fixing part includes a stopper part configured to limit movement of the auto-focusing movable part at least toward an imaging side in the light axis direction; and
the auto-focusing movable part includes a locking part that is locked by the stopper part.

2. The lens driving device according to claim 1, wherein:
the auto-focusing fixing part includes, as the stopper part:
a first stopper part configured to limit movement of the auto-focusing movable part toward a light reception side in the light axis direction, and
a second stopper part configured to limit movement of the auto-focusing movable part toward an imaging side in the light axis direction; and
the auto-focusing movable part includes, as the locking part:
a first locking part that is locked by the first stopper part, and
a second locking part that is locked by the second stopper part.

3. The lens driving device according to claim 2, wherein:
the auto-focusing fixing part includes a magnet holder in which the auto-focusing magnet part is disposed; and
the magnet holder includes at least one of the first stopper part and the second stopper part.

4. The lens driving device according to claim 2, wherein at least one of the first stopper part and the second stopper part is configured by the auto-focusing magnet part.

5. The lens driving device according to claim 2, wherein:
the auto-focusing movable part includes a lens holder in which the auto-focusing coil part is disposed; and
the lens holder includes at least one of the first locking part and the second locking part.

6. The lens driving device according to claim 2, wherein:
the auto-focusing fixing part includes a magnet holder in which the auto-focusing magnet part is disposed;
the auto-focusing movable part includes a lens holder in which the auto-focusing coil part is disposed;
the first stopper is provided on the magnet holder so as to protrude to radially inside;
the second stopper is formed at a top surface of the auto-focusing magnet part; and
the first and second locking parts are provided on the lens holder so as to protrude to radially outside.

7. A camera module comprising:
the lens driving device according to claim 1;
a lens part that is mounted in the auto-focusing movable part; and
an image capturing part configured to capture a subject image imaged with the lens part.

8. A camera-equipped mobile terminal comprising:
the camera module according to claim 7.

* * * * *